(12) United States Patent
Hori et al.

(10) Patent No.: US 8,118,971 B2
(45) Date of Patent: Feb. 21, 2012

(54) INTERLAYER FILM SEPARATION METHOD

(75) Inventors: Masahiro Hori, Tokyo (JP); Kazuishi Mitani, Tokyo (JP); Yasuhiro Saito, Tokyo (JP); Nobuyuki Takatsuki, Tokyo (JP); Kyouichi Shukuri, Sagamihara (JP); Shunji Kuramoto, Sagamihara (JP)

(73) Assignees: Nippon Sheet Glass Company, Limited, Tokyo (JP); Glass Techno Synergy Co., Ltd., Shiga-Ken (JP)

( * ) Notice: Subject to any disclaimer, the term of this patent is extended or adjusted under 35 U.S.C. 154(b) by 958 days.

(21) Appl. No.: 11/991,872

(22) PCT Filed: Sep. 11, 2006

(86) PCT No.: PCT/JP2006/318437
§ 371 (c)(1),
(2), (4) Date: May 8, 2008

(87) PCT Pub. No.: WO2007/032501
PCT Pub. Date: Mar. 22, 2007

(65) Prior Publication Data
US 2010/0206005 A1  Aug. 19, 2010

(30) Foreign Application Priority Data
Sep. 12, 2005 (JP) ................ 2005-264368

(51) Int. Cl.
*B32B 38/10* (2006.01)
(52) U.S. Cl. ........ 156/703; 156/704; 156/705; 156/709; 156/711; 156/754; 156/927; 65/30.1; 65/112
(58) Field of Classification Search ............... 156/344, 156/584, 703, 704, 705, 706, 709, 711, 752, 156/754, 927; 65/30.1, 112
See application file for complete search history.

(56) References Cited

U.S. PATENT DOCUMENTS
4,162,680 A * 7/1979 Coch ............................ 118/76
(Continued)

FOREIGN PATENT DOCUMENTS
EP    0 567 876 A1   11/1993
(Continued)

OTHER PUBLICATIONS
Machine translation of Japanese Patent Publication 07-017747, 1995.*
(Continued)

*Primary Examiner* — Mark A Osele
(74) *Attorney, Agent, or Firm* — Holtz, Holtz, Goodman & Chick, PC

(57) ABSTRACT

There are provided an interlayer film separation solution and an interlayer film separation method capable of separating an interlayer film and a glass for a short period of time and collecting the separated interlayer film in a recyclable condition. An interlayer film separation solution 21 having etching ability for a glass is introduced into a container 22, and the introduced interlayer film separation solution 21 was controlled to a temperature of 30 to 60° C., and a laminated glass 10 with glass plates 11, 12 crushed is introduced into a barrel 23 from a lid portion 23a, and simultaneously, 50 to 60 metal pieces 25 are, introduced into the barrel 23 from the lid portion 23a in order to easily separate the laminated glass 10 into the glass plates 11, 12 and an interlayer film 13. The barrel 23 containing the laminated glass 10 and the metal pieces 25 introduced thereinto is rotated at a predetermined rotational speed.

19 Claims, 2 Drawing Sheets

U.S. PATENT DOCUMENTS

| | | |
|---|---|---|
| 6,502,424 B1 | 1/2003 | Debailleul |
| 2004/0186033 A1* | 9/2004 | Waldrop et al. ............... 510/201 |

FOREIGN PATENT DOCUMENTS

| | | |
|---|---|---|
| EP | 1 422 203 A1 | 5/2004 |
| JP | 30-6684 | 9/1955 |
| JP | 6-247752 A | 9/1994 |
| JP | 07-017747 A | 1/1995 |
| JP | 11-197641 A | 1/1995 |
| JP | 2001-334248 A | 12/2001 |
| JP | 2003-073144 A | 3/2003 |
| WO | WO 99/02460 A1 | 1/1999 |

OTHER PUBLICATIONS

Notification Concerning Transmittal of International Preliminary Report on Patentability, Chapter I of the Patent Cooperation Treaty, dated May 22, 2008, for PCT/JP2006/318437. 4 sheets.

Extended European Search Report dated Aug. 20, 2010 (in English) issued in counterpart European Application No. 06810229.2.

* cited by examiner

INTERLAYER FILM SEPARATION METHOD

This application is a U.S. National Phase Application under 35 USC 371 of International Application PCT/JP2006/318437 filed Sep. 11, 2006.

TECHNICAL FIELD

The present invention relates to an interlayer film separation method for separating an interlayer film and glass plates interposing the interlayer film therebetween. The present invention particularly relates to an interlayer film separation method useful for recycling of interlayer films.

BACKGROUND ART

As a conventional method for recycling a laminated glass, there is a method in which a glass plate in the laminated glass is crushed and this crushed glass plate is immersed in water or water containing a surfactant for several hours to several days, and thereby an interlayer film is swollen to reduce adhesive strength between the interlayer film and the glass plate, thereby separating the interlayer film and the glass plate (see, for example, Japanese Patent Application Laid-Open No. 6-247752).

However, according to the above-mentioned separation method, an interlayer film is swollen and deterioration due to hydrolysis and the like progresses, and therefore, the interlayer film could not be collected in a recyclable condition.

Further, treatment time until the interlayer film and the crushed glass plate can be easily separated is a long period of time as several hours to several days in the above-mentioned separation method, and thus there is a problem that the method is not economically preferable.

An object of the present invention is to provide an interlayer film separation method capable of separating an interlayer film and glass plates for a short period of time and collecting the separated interlayer film in a recyclable condition.

DISCLOSURE OF THE INVENTION

In order to achieve the above-mentioned object, according to a first aspect of the present invention, there is provided an interlayer film separation solution for separating an interlayer film and glass plates interposing the interlayer film therebetween in a laminated glass, wherein the interlayer film separation solution has etching ability for the glass plates.

According to the first aspect of the present invention, the interlayer film separation solution is preferably an acidic aqueous solution comprising a fluorine ion.

According to the first aspect of the present invention, the interlayer film separation solution preferably has an etching rate of 3 nm/min or more to each of the glass plates.

According to the first aspect of the present invention, the interlayer film separation solution preferably comprises $HF_2^-$ as the fluorine ion.

According to the first aspect of the present invention, a concentration of the $HF_2^-$ is preferably 0.0005 mol/L or more.

According to the first aspect of the present invention, a concentration of the $HF_2^-$ is preferably from 0.0005 mol/L to 0.05 mol/L.

According to the first aspect of the present invention, the acidic aqueous solution preferably comprises a strong acid.

According to the first aspect of the present invention, the acidic aqueous solution preferably comprises a complex forming component.

According to the first aspect of the present invention, the complex forming component preferably comprises one or two or more compounds selected from the group consisting of oxycarboxylic acids such as oxalic acid, tartaric acid, malic acid, malonic acid, citric acid, succinic acid and gluconic acid, and salts thereof, and phosphonic acids such as phosphoric acid, hydroxyethane diphosphonic acid (HEDP) and tripolyphosphoric acid (STPP), and salts thereof.

According to the first aspect of the present invention, the interlayer film separation solution is preferably an alkaline aqueous solution.

According to the first aspect of the present invention, the alkaline aqueous solution preferably comprises a complex forming component.

According to the first aspect of the present invention, the complex forming component preferably includes one or two or more compounds selected from the group consisting of aminocarboxylic acids such as ethylenediaminetetraacetic acid (EDTA), nitrilotriacetic acid (NTA), and diethylenetriaminepentaacetic acid (DTPA), and salts thereof, and phosphonic acids such as phosphoric acid, hydroxyethane diphosphonic acid (HEDP) and tripolyphosphoric acid (STPP), and salts thereof.

According to the first aspect of the present invention, the interlayer film separation solution preferably has a surface tension of 45 N/m or less.

According to the first aspect of the present invention, the interlayer film separation solution preferably comprises a surfactant.

In order to achieve the above-mentioned object, according to an aspect of the present invention, there is provided an interlayer film separation method for separating an interlayer film and glass plates interposing the interlayer film therebetween in a laminated glass, the interlayer film separation method comprising: a crushing process step of crushing the glass plates in the laminated glass; an immersion step of immersing the laminated glass with the glass plates crushed in the interlayer film separation solution for separating the interlayer film and the glass plates, the interlayer film separation solution having etching capability for the glass plates; and an impact imparting step of imparting an impact to the laminated glass as an external force by introducing the laminated glass with the glass plates crushed into a barrel and rotating the barrel.

In the aspect of the present invention, the interlayer film separation solution is preferably set to a temperature of 30 to 60° C.

In the second aspect of the present invention, laminated glass with the glass plates crushed is preferably introduced into a rotatable barrel.

In the second aspect of the present invention, a separation accelerating member is preferably introduced into the barrel.

In the second aspect of the present invention, the barrel preferably has an opening.

BEST MODE FOR CARRYING OUT THE INVENTION

Figure 1:
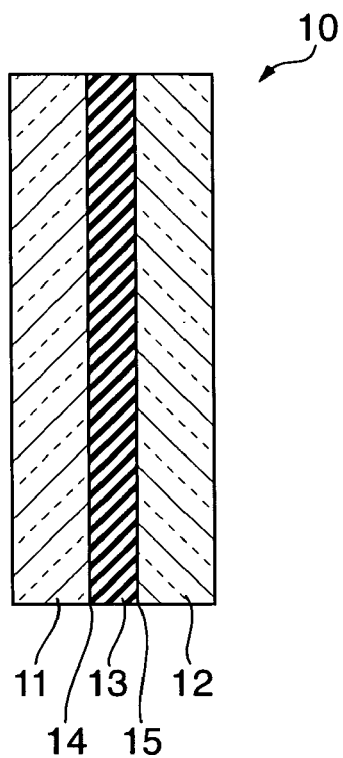
FIG. 1 is a cross-sectional view schematically showing a structure of laminated glass in which an interlayer film separation method according to the present embodiment is performed.

The present inventors have made intensive studies in order to achieve the above-mentioned object, and as a result, they have found that when an interlayer film separation solution has etching ability for glass plates, the interlayer film separation solution can be easily penetrated into an interface between a glass and an interlayer film by etching (dissolution) action on a glass surface, and therefore the interlayer film and the glass plate can be separated for a short period of time and the separated interlayer film can be collected in a recyclable condition.

The present invention has been made based on the results of the above-mentioned studies.

Further, as a technique for enhancing penetration capability of liquid, a method in which the surface tension is reduced by adding a surfactant or the like to a liquid is generally known (Wettability Technology Hand book, p. 221, published by Techno System Inc.), but an interlayer film separation solution can not be easily penetrated into an interface between a glass and an interlayer film only by reducing the surface tension.

An interlayer film separation solution and an interlayer film separation method according to the present embodiment will be described below.

An acidic aqueous solution containing a fluorine ion or an alkaline aqueous solution is used as an interlayer film separation solution.

When an interlayer film separation solution is an acidic aqueous solution containing a fluorine ion, a glass surface is etched (dissolved) by the acidic aqueous solution, and thereby the acidic aqueous solution can be easily penetrated into an interface between an interlayer film and a glass to separate the glass from the interlayer film.

When a concentration of an ion species cleaving a siloxane bond, that is, an $HF_2^-$ concentration becomes less than 0.0005 mol/L in an acidic aqueous solution containing a fluorine ion, the $HF_2^-$ concentration decreases during a separation process for separating an interlayer film and a glass, and thus an etching rate for the glass is reduced. Accordingly, it is preferable for separation for a short period of time that the $HF_2^-$ concentration is 0.0005 mol/L or more. On the other hand, when the $HF_2^-$ concentration is excessively high, a large amount of precipitate of fluoride is generated as an etching residue, and therefore it is not preferable because an operational problem is caused.

When diluted hydrofluoric acid is used as an acidic aqueous solution containing a fluorine ion, main chemical species present in this diluted hydrofluoric acid are HF, $H^+$, $F^-$ and $HF_2^-$ and expressed by the following equilibrium formulas (1) and (2).

$$[HF] \Leftrightarrow [H^+]+[F^-] \tag{1}$$

$$[HF_2^-] \Leftrightarrow [HF]+[F^-] \tag{2}$$

Equilibrium constants in the equilibrium formulas (1) and (2) are respectively expressed as $K_1$ and $K_2$. $K_1$ and $K_2$ are estimated by various techniques, typically by an electrochemical technique. A $[HF_2^-]$ concentration can be calculated from values of $K_1$ and $K_2$, a hydrogen ion concentration $[H^+]$ and a hydrofluoric acid concentration $[HF]$ in hydrofluoric acid.

Further, when an ammonium fluoride aqueous solution is used as an acidic aqueous solution containing a fluorine ion, chemical species mainly present in this ammonium fluoride aqueous solution are $NH_4F$, HF, $H^+$, $F^-$, $HF_2^-$ and $NH_4^+$, and are expressed by the following equilibrium formulas (3) to (5).

$$[HF] \Leftrightarrow [H^+]+[F^-] \tag{3}$$

$$[NH_4F] \Leftrightarrow [NH_4^+]+[F^-] \tag{4}$$

$$[HF_2^-] \Leftrightarrow [HF]+[F^-] \tag{5}$$

Equilibrium constants in the equilibrium formulas (3) to (5) are respectively expressed as $K_3$, $K_4$ and $K_5$. $K_3$, $K_4$ and $K_5$ are estimated by various techniques, typically by an electrochemical technique. A $[HF_2^-]$ concentration can be calculated from values of $K_3$, $K_4$ and $K_5$, and a hydrogen ion concentration $[H^+]$ and a concentration of ammonium fluoride $[NH_4F]$.

Herein, as the acidic aqueous solution containing a fluorine ion, hydrofluoric acid and an ammonium fluoride aqueous solution have been exemplified, but is not limited to these compounds, and a mixture of ammonium sulfate and hydrofluoric acid, a mixture of hydrofluoric acid and an acid, a hydrofluosilicic acid aqueous solution and the like may be used. In addition, as an acid to be mixed in, sulfamic acid, phosphoric acid, nitric acid, sulfuric acid, acetic acid, formic acid, hydrochloric acid, carbonic acid and the like can be used.

When an interlayer film separation solution is an alkaline aqueous solution, the interlayer film separation solution cleaves a bond (interaction) at an interface between an interlayer film and a glass and etches (dissolves) a glass surface slightly, and a surface of the interlayer film is slightly dissolved, and thereby the interlayer film separation solution can be easily penetrated into the interface between the interlayer film and the glass, so that the interlayer film and the glass can be separated for a short time of period.

A component included in an alkaline aqueous solution is not limited, and may be, for example, potassium hydroxide, sodium hydroxide, potassium carbonate, potassium phosphate, potassium silicate, sodium carbonate, sodium phosphate, or sodium silicate.

A complex forming component is added to an interlayer film separation solution, and thereby, a glass component can be trapped in an ion form during glass etching to further enhance etching ability for a glass.

When an interlayer film separation solution is an acidic aqueous solution, as the complex forming component, the followings can be suitably combined to be used: oxycarboxylic acids such as oxalic acid, tartaric acid, malic acid, malonic acid, citric acid, succinic acid and gluconic acid, and salts thereof, and phosphonic acids such as phosphoric acid, hydroxyethane diphosphonic acid (HEDP) and tripolyphosphoric acid (STPP), and salts thereof. On the other hand, when an interlayer film separation solution is an alkaline aqueous solution, as the complex forming component, the followings can be suitably combined to be used: aminocarboxylic acids such as ethylenediaminetetraacetic acid (EDTA), nitrilotriacetic acid (NTA), and diethylenetriaminepentaacetic acid (DTPA), and salts thereof, and phosphonic acids such as phosphoric acid, hydroxyethane diphosphonic acid (HEDP) and tripolyphosphoric acid (STPP), and salts thereof.

Further, when a surfactant, an alcohol such as ethanol or isopropanol, a hydrocarbon-based organic solvent or the like is added to an interlayer film separation solution, surface tension of the interlayer film separation solution can be reduced, and thereby the interlayer film separation solution can be easily penetrated into an interface between a glass and an interlayer film.

Herein, when an alcohol, an organic solvent or the like is added to an interlayer film separation solution to reduce the surface tension, the interlayer film separation solution can be easily penetrated into an interface between a glass and an interlayer film, but the alcohol or the organic solvent penetrates the interlayer film, thereby causing swelling or deterioration of the interlayer film. On the other hand, when a surfactant is used, the surfactant itself does not penetrate the interlayer film, and thereby swelling or deterioration of the interlayer film can be prevented. Therefore, it is preferable for preventing the interlayer film from swelling or deteriorating that a surfactant is used to reduce the surface tension of the interlayer film separation solution. Further, examples of the surfactant include nonionic surfactants, anion surfactants and amphoteric surfactants.

FIG. 1 is a cross-sectional view schematically showing a structure of laminated glass in which an interlayer film separation method according to the present embodiment is performed.

In FIG. 1, a laminated glass 10 includes an interlayer film 13 and glass plates 11, 12 interposing the interlayer film 13 therebetween, and PVB (polyvinyl butyral), EVA (ethylene-vinyl acetate copolymer) or the like is used as a material of the interlayer film 13.

Firstly, when the glass plates 11, 12 in the laminated glass 10 to be treated are crushed, glass chips of the crushed glass plates 11, 12 become in a state where they are still tightly adhered to the interlayer film 13. When these glass chips are large, it requires a long period of time for penetrating an interlayer film separation solution up to interface 14 or 15 between the interlayer film 13 and the glass plate 11 or 12, respectively, and thus a size of each of the glass chips is set to 25 mm$^2$ or less. Further, cracks in the glass plates 11, 12 reach the interfaces 14, 15, respectively, so as to penetrate the interlayer film separation solution up to the interfaces 14, 15.

Figure 2:
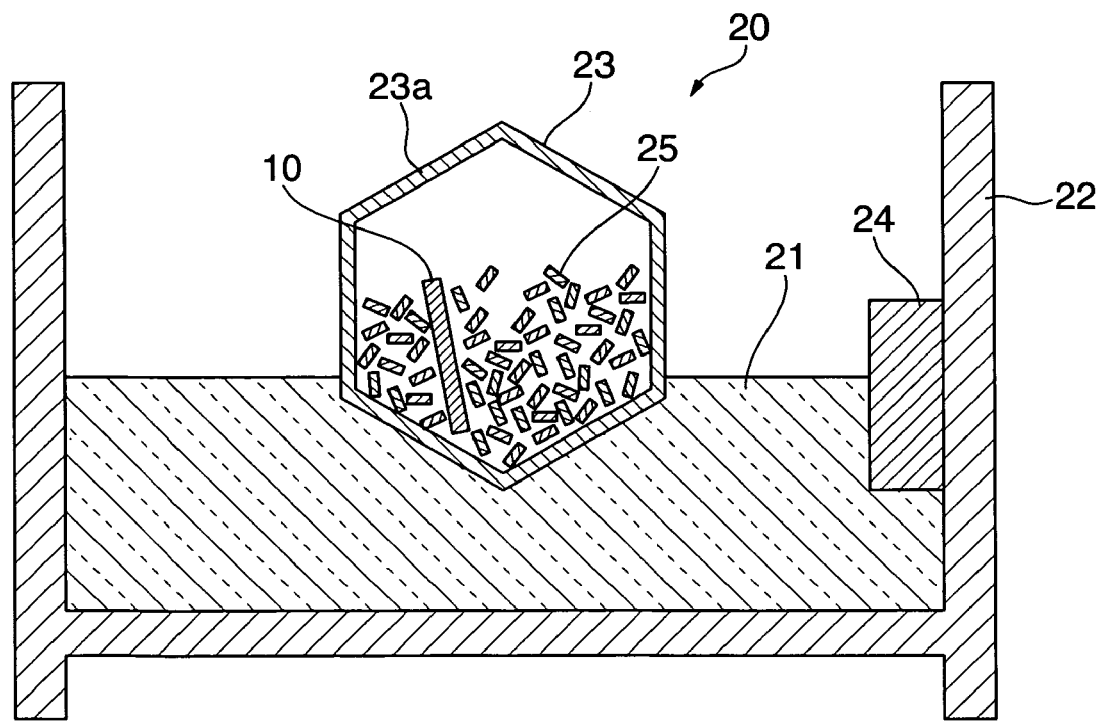
FIG. 2 is a cross-sectional view schematically showing a structure of a liquid bath used for immersing the laminated glass of FIG. 1 into an interlayer film separation solution.

FIG. 2 is a cross-sectional view schematically showing a structure of a liquid bath used for immersing the laminated glass 10 of FIG. 1 into an interlayer film separation solution.

In FIG. 2, a liquid bath 20 includes a container 22 for storing an interlayer film separation solution 21, a barrel 23 rotatably disposed inside of the container 22, and having a lid portion 23a and an opening opened over its entire surface, and a thermoregulator 24 for controlling a temperature of the interlayer film separation solution 21.

Firstly, an interlayer film separation solution 21 having etching ability for a glass is introduced into the container 22, and the introduced interlayer film separation solution 21 is controlled to a temperature of 30 to 60° C., and the laminated glass 10 with the glass plates 11, 12 crushed is introduced into the barrel 23 from the lid portion 23a, and simultaneously, 50 to 60 metal pieces 25 (separation accelerating member) of 3 cm×3 cm such as iron pieces and stainless steel pieces are introduced into the barrel 23 from the lid portion 23a in order to easily separate the laminated glass 10 into the glass plates 11, 12 and the interlayer film 13 that are constituting materials of the laminated glass 10. The barrel 23 containing the laminated glass 10 and the metal pieces 25 introduced thereinto is rotated at a predetermined rotational speed. As a result, when the laminated glass 10 is immersed in the interlayer film separation solution 21, an impact generated by the metal pieces 25 is applied to the laminated glass 10 as an external force, and thereby the interlayer film 13 is easily separated from the glass plates 11, 12.

According to the present embodiment, since the interlayer film separation solution 21 has etching ability for a glass, the interlayer film 13 can be separated from the glass plates 11, 12 for a short period of time and the separated interlayer film 13 can be recycled.

According to the present embodiment, the impact generated by the metal pieces 25 is used as an external force applied to the laminated glass 10, but the external force is not limited to this impact and may be any other impact. Further, the external force is not an impact, but may be, for example, water flow, self-weight deformation, vibration, oscillation or stripping.

The temperature of the interlayer film separation solution 21 is set to 30 to 60° C. which is not less than a softening point of the interlayer film 13 and in a temperature range such that the interlayer film 13 is not thermally deteriorated, and thereby the glass plates 11, 12 can be separated from the interlayer film 13 for a short period of time. The interlayer film 13 is deformed by setting a temperature of the solution to be not less than the softening point at which the interlayer film 13 can be easily deformed, and thereby the interlayer film separation solution 21 is easily penetrated into the interfaces 14, 15, so that the interlayer film 13 can be separated from the glass plates 11, 12 for a shorter period of time. It is preferable that the temperature of the solution is as high within the above-mentioned temperature range (30 to 60° C.) as possible because the interlayer film can be easily deformed.

EXAMPLE 1

In Example 1, the interlayer film separation solution 21 was introduced into the container 22, and the introduced interlayer film separation solution 21 was controlled to a temperature of 40° C., and the laminated glass 10 with cracks reaching interfaces 14, 15 in the glass plates 11, 12, respectively, was introduced into the barrel 23 with the metal pieces 25 and immersed in the interlayer film separation solution 21. In this case, six types of treatment liquids (samples 1 to 6) were prepared so that the $HF_2^-$ concentration were 0 to 0.08 mol/L as the interlayer film separation solution 21. Each of these treatment liquids was obtained by diluting an aqueous solution of about 23 mol/L (46 wt %) hydrofluoric acid with water.

Concentrations of hydrofluoric acid aqueous solutions, $HF_2^-$ concentrations, etching rates, and time (separation time) until glass is completely separated from the laminated glass 10 (a weight ratio of a total weight of the glass plates 11, 12 to a total weight of glass remaining on the interlayer film 13 (a residual rate of glass) becomes 0%) for these treatment liquids are shown in Table 1.

TABLE 1

| Treated water | Comp. Ex. 1 | Sample 1 | Sample 2 | Sample 3 | Sample 4 | Sample 5 | Sample 6 |
|---|---|---|---|---|---|---|---|
| Hydrofluoric acid aqueous solution (mol/L(wt %)) | 0 (0) | 0.002 (0.0001) | 0.005 (0.01) | 0.05 (0.1) | 0.25 (0.5) | 0.50 (1.0) | 0.75 (1.5) |

TABLE 1-continued

| Treated water | Comp. Ex. 1 | Sample 1 | Sample 2 | Sample 3 | Sample 4 | Sample 5 | Sample 6 |
|---|---|---|---|---|---|---|---|
| $HF_2^-$ (mol/L) | 0.0000 | 0.0001 | 0.0005 | 0.0052 | 0.0258 | 0.0516 | 0.0774 |
| Etching rate (nm/min) | 0 | 0.3 | 3.0 | 30 | 150 | 300 | 450 |
| Separation time (min) | 60 | 30 | 15 | 10 | 5 | 3 | 2 |

Herein, an etching rate was obtained by the following procedure. That is, the glass is subjected to alkaline cleaning, sufficiently rinsed with pure water and dried, and a portion of the glass is masked with an acid-resistant tape and immersed in a predetermined concentration of hydrofluoric acid aqueous solution for 30 minutes, and thereafter the acid-resistant tape is peeled off and a step height on a glass surface formed by etching is measured by a surface roughness meter.

Figure 3:
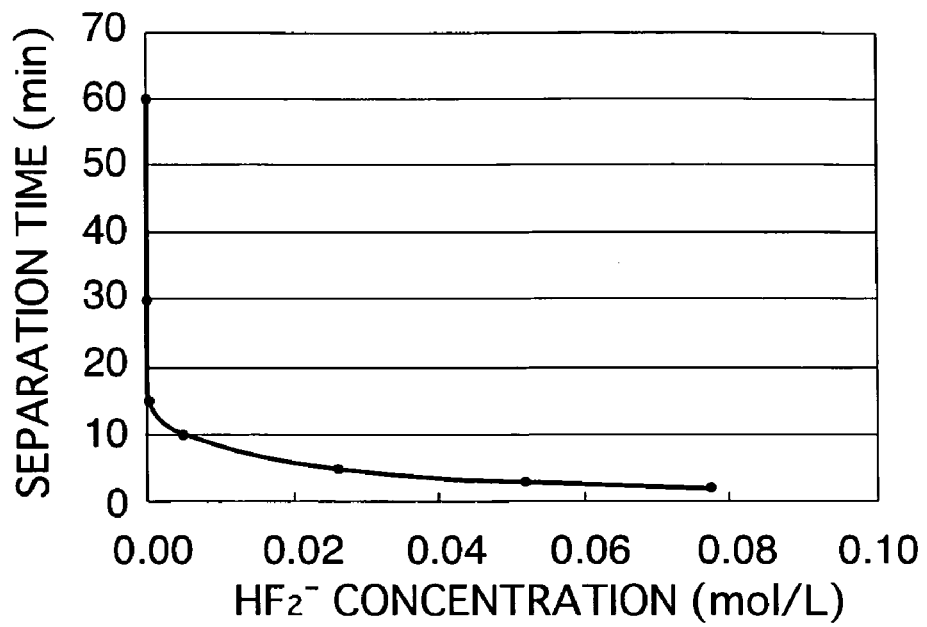
FIG. 3 is a graph showing the relationship between an $HF_2^-$ concentration and time until a residual rate of glass becomes 0% in an interlayer film separation solution according to the present embodiment.

FIG. 3 is a graph showing the relationship between an $HF_2^-$ concentration and time until a residual rate of glass becomes 0% in the interlayer film separation solution (40° C.) according to the present embodiment.

It has been found from FIG. 3 that etching rate is significantly reduced when an $HF_2^-$ concentration is not 0.0005 mol/L or more. On the other hand, it has also been found that there is not any large difference in separation time even when an $HF_2^-$ concentration is 0.05 mol/L or more.

EXAMPLE 2

Figure 4:
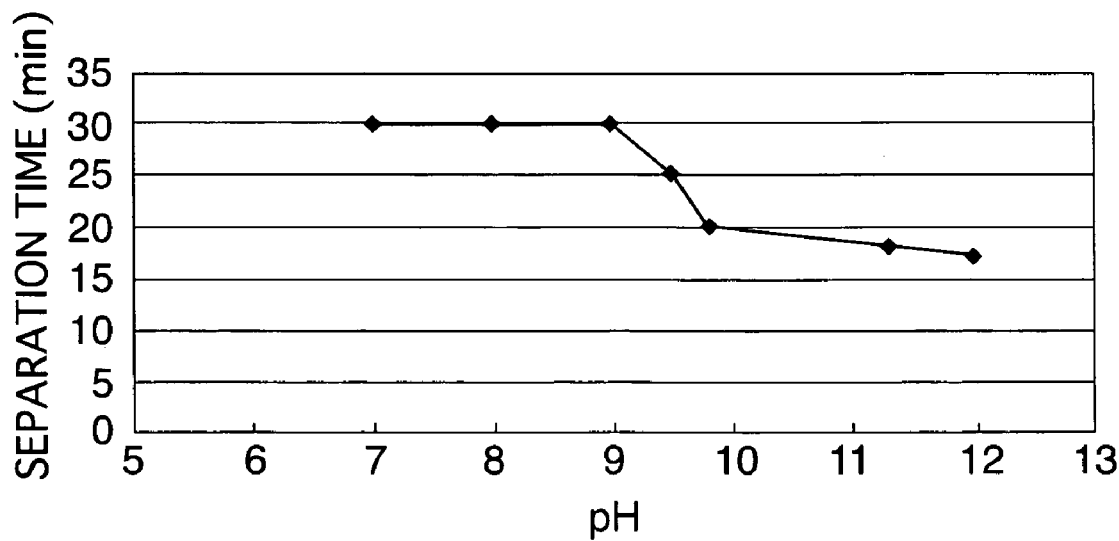
FIG. 4 is a graph showing the relationship between a hydrogen ion concentration (pH) and time until a residual rate of glass becomes 0% in an interlayer film separation solution according to the present embodiment.

In Example 2, an interlayer film separation solution 21 was introduced into a container 22, and the introduced interlayer film separation solution 21 was controlled to a temperature of 40° C., and laminated glass 10 with cracks reaching interfaces 14, 15 in glass plates 11, 12, respectively, was introduced into a barrel 23 with metal pieces 25 and immersed in the interlayer film separation solution 21. In this case, 7 types of potassium hydroxide aqueous solutions were prepared as the interlayer film separation solution 21 so that the hydrogen ion concentration (pH) were 7 to 12. Each of these potassium hydroxide aqueous solutions was obtained by dissolving potassium hydroxide in water and adjusting the resulting solution to have a concentration of 0 to 0.1 wt %. FIG. 4 is a graph showing the relationship between a hydrogen ion concentration (pH) and time until a residual rate of glass becomes 0% in an interlayer film separation solution (40° C.) according to the present embodiment.

It has been found from FIG. 4 that separation time is significantly shortened when a hydrogen ion concentration (pH) becomes 9.5 or more.

EXAMPLE 3

In Example 3, an interlayer film separation solution 21 was introduced into a container 22, and the introduced interlayer film separation solution 21 was controlled to a temperature of 40° C., and laminated glass 10 with cracks reaching interfaces 14, 15 in glass plates 11, 12, respectively, was introduced into a barrel 23 with metal pieces 25 and immersed in the interlayer film separation solution 21. In this case, an acidic aqueous solution containing hydrofluoric acid ($HF_2^-$ concentration: 0.005 mol/L) and a surfactant (0.5 wt %), and having a hydrogen ion concentration (pH) of 1.9 was used as the interlayer film separation solution 21. An etching rate and a surface tension of this acidic aqueous solution were 30 nm/min and 35 N/m, respectively. In addition, time until a residual rate of glass becomes 0% was 9 minutes. It was found from the comparison with the time until a residual rate of glass becomes 0% (10 minutes) when the laminated glass 10 was immersed in Sample 3 in Table 1, that when a surfactant was added to the solution, penetration capability of the interlayer film separation solution 21 into the interfaces 14, 15 was improved, and the time until a residual rate of glass becomes 0% was shortened by 1 minute compared with a case where a surfactant was not added to the solution.

Further, when the temperature of an interlayer film separation solution was 55° C., time until a residual rate of glass becomes 0% was 2 minutes, which was shortened to ¼ or less of the time when the temperature of an interlayer film separation solution was 40° C. (9 minutes).

EXAMPLE 4

In Example 4, an interlayer film separation solution 21 was introduced into a container 22, and the introduced interlayer film separation solution 21 was controlled to a temperature of 40° C., and laminated glass 10 with cracks reaching interfaces 14, 15 in glass plates 11, 12, respectively, was introduced into a barrel 23 with metal pieces 25 and immersed in the interlayer film separation solution 21. In this case, an acidic aqueous solution containing hydrofluoric acid ($HF_2^-$ concentration: 0.005 mol/L) and tartaric acid (0.1 wt %) serving as a complex forming component, and having a hydrogen ion concentration (pH) of 1.6 was used as the interlayer film separation solution 21. An etching rate of this solution was 60 nm/min that is 2 times an etching rate when a complex forming component was not added to the solution. In addition, time until a residual rate of glass becomes 0% was 6 minutes. When a complex forming component was added to the solution, an etching rate of the solution became 2 times, and time until a residual rate of glass becomes 0% was shortened to about ½ of the time when a complex forming component was not added to the solution.

Further, when the temperature of an interlayer film separation solution was 55° C., time until a residual rate of glass becomes 0% was 2 minutes, which was shortened to ⅓ of the time when the temperature of an interlayer film separation solution was 40° C. (6 minutes).

EXAMPLE 5

In Example 5, an interlayer film separation solution 21 was introduced into a container 22, and the introduced interlayer film separation solution 21 was controlled to a temperature of 40° C., and laminated glass 10 with cracks reaching interfaces 14, 15 in glass plates 11, 12, respectively, was introduced into a barrel 23 with metal pieces 25 and immersed in the interlayer film separation solution 21. In this case, an acidic aqueous solution containing a 0.35 wt % ammonium fluoride aqueous solution ($HF_2^-$ concentration: 0.01 mol/L) and phosphoric acid (2 wt %) serving as an acid component providing a proton, and having a hydrogen ion concentration (pH) of 1.8 was used as the interlayer film separation solution 21. An etching rate of this acidic aqueous solution was 60 nm/min. In addition, time until a residual rate of glass becomes 0% was 6 minutes.

As described above, even when either hydrofluoric acid or ammonium fluoride was used as a source of fluorine ions, if $HF_2^-$ concentrations of them were equal, etching rates of them were also equal, and thus times required for separation of an interlayer film and a glass were also equal.

Further, when the temperature of an interlayer film separation solution was 55° C., time until a residual rate of glass becomes 0% was 2 minutes, which was shortened to ⅓ of the time when the temperature of an interlayer film separation solution was 40° C. (6 minutes).

EXAMPLE 6

In Example 6, an interlayer film separation solution 21 was introduced into a container 22, and the introduced interlayer film separation solution 21 was controlled to a temperature of 40° C., and laminated glass 10 with cracks reaching interfaces 14, 15 in glass plates 11, 12, respectively, was introduced into a barrel 23 with metal pieces 25 and immersed in the interlayer film separation solution 21. In this case, an alkaline aqueous solution containing potassium hydroxide (0.05 wt %) and a surfactant (0.5 wt %), and having a hydrogen ion concentration (pH) of 11.0 was used as the interlayer film separation solution 21. An etching rate and a surface tension of this solution were 0.05 nm/min and 25 N/m, respectively. In addition, when a surfactant was not added to the solution, the surface tension was 60 N/m.

Further, time until a residual rate of glass becomes 0% was 15 minutes. When a surfactant was not added to a potassium hydroxide aqueous solution having a pH of 11.0, the time until a residual rate of glass becomes 0% was 18 minutes. On the contrary, when a surfactant was added to the solution, penetration capability of the interlayer film separation solution 21 into the interfaces 14, 15 was improved, and the time until a residual rate of glass becomes 0% was shortened to 15 minutes.

Further, when the temperature of an interlayer film separation solution was 55° C., time until a residual rate of glass becomes 0% was 4 minutes, which was shortened to ⅓ or less of the time when the temperature of an interlayer film separation solution was 40° C. (15 minutes).

EXAMPLE 7

In Example 7, an interlayer film separation solution 21 was introduced into a container 22, and the introduced interlayer film separation solution 21 was controlled to a temperature of 40° C., and laminated glass 10 with cracks reaching interfaces 14, 15 in glass plates 11, 12, respectively, was introduced into a barrel 23 with metal pieces 25 and immersed in the interlayer film separation solution 21. In this case, an alkaline aqueous solution containing potassium hydroxide (0.1 wt %), a surfactant (0.5 wt %) and disodium ethylenediaminetetraacetate (EDTA.2Na) (0.5 wt %) serving a complex forming component, and having a hydrogen ion concentration (pH) of 11.0 was used as the interlayer film separation solution 21. An etching rate of this alkaline aqueous solution was 0.10 nm/min that is 2 times an etching rate when a complex forming component was not included. In addition, time until a residual rate of glass becomes 0% was 10 minutes. An etching rate became 2 times by adding a complex forming component and a surfactant, and thereby penetration capability of the interlayer film separation solution 21 into the interfaces 14, 15 was improved, so that glass plates could be separated from an interlayer film in short separation time as compared with that of a sodium hydroxide aqueous solution having a pH of 11.0 in which a complex forming component and a surfactant were not added to the solution.

Further, when the temperature of an interlayer film separation solution was 55° C., time until a residual rate of glass becomes 0% was 4 minutes, which was shortened to ½ or less of the time when the temperature of an interlayer film separation solution was 40° C. (10 minutes).

Comparative Example 1

In Comparative Example 1, an interlayer film separation solution 21 was introduced into a container 22, and the introduced interlayer film separation solution 21 was controlled to a temperature of 40° C., and laminated glass 10 with cracks reaching interfaces 14, 15 in glass plates 11, 12, respectively, was introduced into a barrel 23 with metal pieces 25 and immersed in the interlayer film separation solution 21. In this case, a neutral aqueous solution containing a surfactant (0.5 wt %) and having a hydrogen ion concentration (pH) of 7.5 was used as the interlayer film separation solution 21. An etching rate of this solution was 0 nm/min. In addition, time until a residual rate of glass becomes 0% was 60 minutes (Comparative Example 1 in Table 1).

EXAMPLE 8

In Example 8, 14 kinds of laminated glass 10 shown in Table 2 were prepared, and 14 kinds of laminated glass 10 with cracks reaching interfaces 14, 15 in glass plates 11, 12, respectively, were prepared as samples 7 to 20. FL and F3A in Table 2 indicate a float glass and a figured glass, respectively, produced by Nippon Sheet Glass Co., Ltd.

TABLE 2

| | Sample | | | | | | | | | | | | | |
|---|---|---|---|---|---|---|---|---|---|---|---|---|---|---|
| | 7 | 8 | 9 | 10 | 11 | 12 | 13 | 14 | 15 | 16 | 17 | 18 | 19 | 20 |
| Glass plate 11 | FL | FL | FL | FL | FL | FL | FL | FL | FL | FL | FL | FL | FL | FL |
| Thickness (mm) | 3 | 3 | 3 | 3 | 3 | 2 | 2.5 | 5 | 8 | 10 | 3 | 3 | 5 | 10 |
| Glass plate 12 | FL | FL | FL | FL | FL | F3A | F3A | FL | FL | FL | FL | FL | FL | FL |
| Thickness (mm) | 3 | 3 | 3 | 3 | 3 | 3 | 3 | 5 | 8 | 10 | 3 | 3 | 5 | 10 |
| Interlayer film 13 | PVB | PVB | PVB | PVB | PVB | PVB | PVB | PVB | PVB | PVB | EVA | EVA | EVA | EVA |
| Thickness (μm) | 380 | 507 | 760 | 1520 | 2280 | 760 | 760 | 760 | 760 | 760 | 250 | 400 | 400 | 400 |
| Separation Ex. 8 | 14 | 16 | 15 | 17 | 19 | 16 | 14 | 17 | 16 | 18 | 14 | 14 | 17 | 16 |
| time (min) Comp. Ex. 2 | 60 | 63 | 65 | 68 | 70 | 60 | 58 | 63 | 61 | 63 | 58 | 58 | 61 | 62 |

Next, an interlayer film separation solution 21 was introduced into a container 22, and the introduced interlayer film separation solution 21 was controlled to a temperature of 40° C., and thereafter, each of the above-mentioned samples 7 to 20 was introduced into a barrel 23 with metal pieces 25 and immersed in the interlayer film separation solution 21. In this case, an alkaline aqueous solution containing potassium hydroxide (0.05 wt %) and a surfactant (0.5 wt %), and having a hydrogen ion concentration (pH) of 11.0 was used as the interlayer film separation solution 21. An etching rate and a surface tension of this solution were 0.05 nm/min and 25 N/m, respectively.

Time until a residual rate of glass becomes 0% after immersing each of the samples in the interlayer film separation solution 21 was 14 minutes to 19 minutes as shown in Table 2.

Comparative Example 2

On the other hand, time until a residual rate of glass becomes 0% was measured also for the case where an interlayer film separation solution 21' that is a neutral aqueous solution containing a surfactant (0.5 wt %) and having a hydrogen ion concentration (pH) of 7.5 was used in replace of the above-mentioned interlayer film separation solution 21 of Example 8. An etching rate of this solution was 0 nm/min.

Time until a residual rate of glass becomes 0% when each of the samples was immersed in the interlayer film separation solution 21' was 58 minutes to 70 minutes as shown in Table 2.

The invention claimed is:

1. An interlayer film separation method for separating an interlayer film and glass plates interposing the interlayer film therebetween in a laminated glass, the interlayer film separation method comprising:
  crushing the glass plates in the laminated glass into glass pieces with the interlayer film untorn and maintained in an original size;
  immersing, inside a barrel, the interlayer film with the glass pieces in an interlayer film separation solution for separating the interlayer film and the glass pieces, wherein the interlayer film separation solution comprises an acidic aqueous solution having etching capability for the glass pieces; and
  imparting an impact to the glass pieces and the interlayer film as an external force by introducing the interlayer film with the glass pieces into the barrel and rotating the barrel.

2. The interlayer film separation method according to claim 1, further comprising setting the interlayer film separation solution to a temperature of 30 to 60° C.

3. The interlayer film separation method according to claim 1, further comprising introducing a separation accelerating member into the barrel.

4. The interlayer film separation method according to claim 3, wherein the separation accelerating member introduced into the barrel comprises a plurality of metal pieces.

5. The interlayer film separation method according to claim 4, wherein the plurality of metal pieces include iron pieces or stainless steel pieces having substantially a size of 3 cm×3 cm.

6. The interlayer film separation method according to claim 1, wherein the barrel has an opening.

7. The interlayer film separation method according to claim 1, wherein the acidic aqueous solution is selected from the group consisting of hydrofluoric acid, an ammonium fluoride aqueous solution, a mixture of ammonium sulfate and hydrofluoric acid, and a hydrofluosilicic acid aqueous solution.

8. The interlayer film separation method according to claim 1, wherein the interlayer film separation solution further includes a complex forming component.

9. The interlayer film separation method according to claim 8, wherein the complex forming component is selected from at least one of the group consisting of oxycarboxylic acids, salts thereof, phosphonic acids, and salts thereof.

10. An interlayer film separation method for separating an interlayer film and glass plates interposing the interlayer film therebetween in a laminated glass, the interlayer film separation method comprising:
  crushing the glass plates in the laminated glass into glass pieces with the interlayer film untorn and maintained in an original size;
  immersing, inside a barrel, the interlayer film with the glass pieces in an interlayer film separation solution for separating the interlayer film and the glass pieces, wherein the interlayer film separation solution comprises an alkaline aqueous solution having etching capability for the glass pieces, and includes one selected from the group consisting of a surfactant, an alcohol, and a hydrocarbon-based organic solvent, that reduces surface tension of the interlayer film separation solution; and
  imparting an impact to the glass pieces and the interlayer film as an external force by introducing the interlayer film with the glass pieces into the barrel and rotating the barrel.

11. The interlayer film separation method according to claim 10, further comprising setting the interlayer film separation solution to a temperature of 30 to 60° C.

12. The interlayer film separation method according to claim 10, wherein the barrel has an opening.

13. The interlayer film separation method according to claim 10, further comprising introducing a separation accelerating member into the barrel.

14. The interlayer film separation method according to claim 13, wherein the separation accelerating member introduced into the barrel comprises a plurality of metal pieces.

15. The interlayer film separation method according to claim 14, wherein the plurality of metal pieces include iron pieces or stainless steel pieces having substantially a size of 3 cm×3 cm.

16. The interlayer film separation method according to claim 10, wherein the surfactant is selected from the group consisting of nonionic surfactants, anion surfactants and amphoteric surfactants.

17. The interlayer film separation method according to claim 10, wherein the alkaline aqueous solution is selected from the group consisting of potassium hydroxide, sodium hydroxide, potassium carbonate, potassium phosphate, potassium silicate, sodium carbonate, sodium phosphate, and sodium silicate.

18. The interlayer film separation method according to claim 10, wherein the interlayer film separation solution further includes a complex forming component.

19. The interlayer film separation method according to claim 18, wherein the complex forming component is selected from at least one of the group consisting of aminocarboxylic acids, salts thereof, phosphonic acids, and salts thereof.

* * * * *